United States Patent Office 3,397,240
Patented Aug. 13, 1968

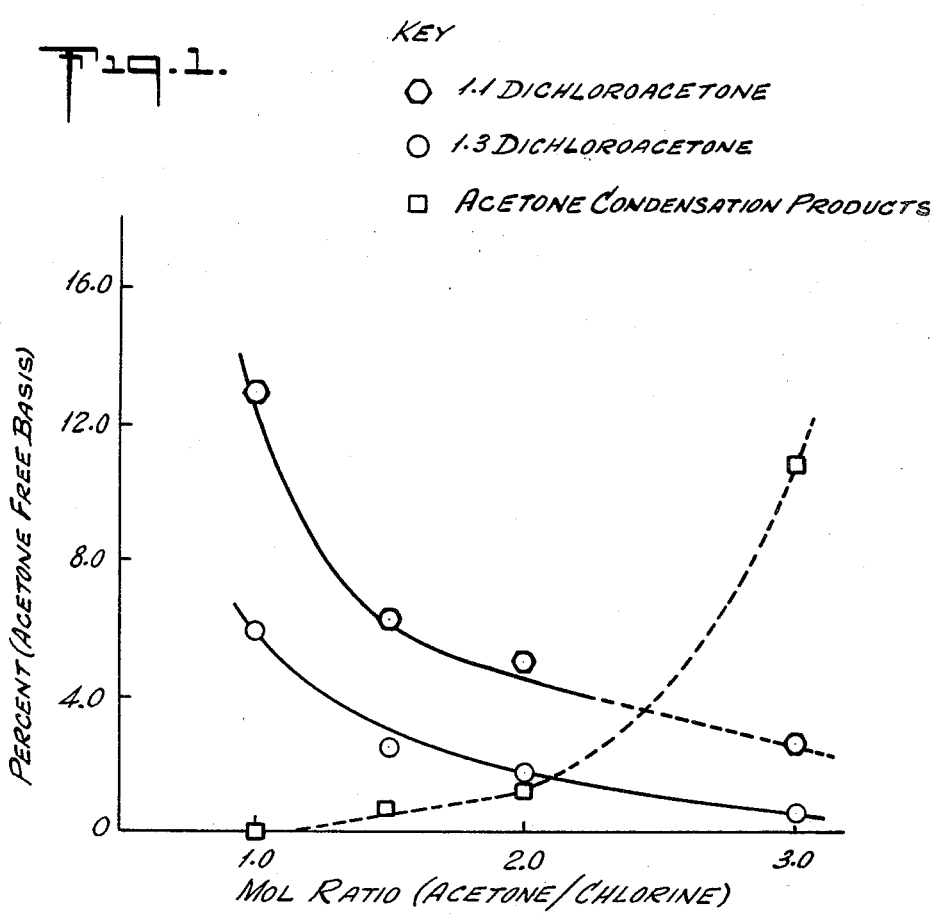

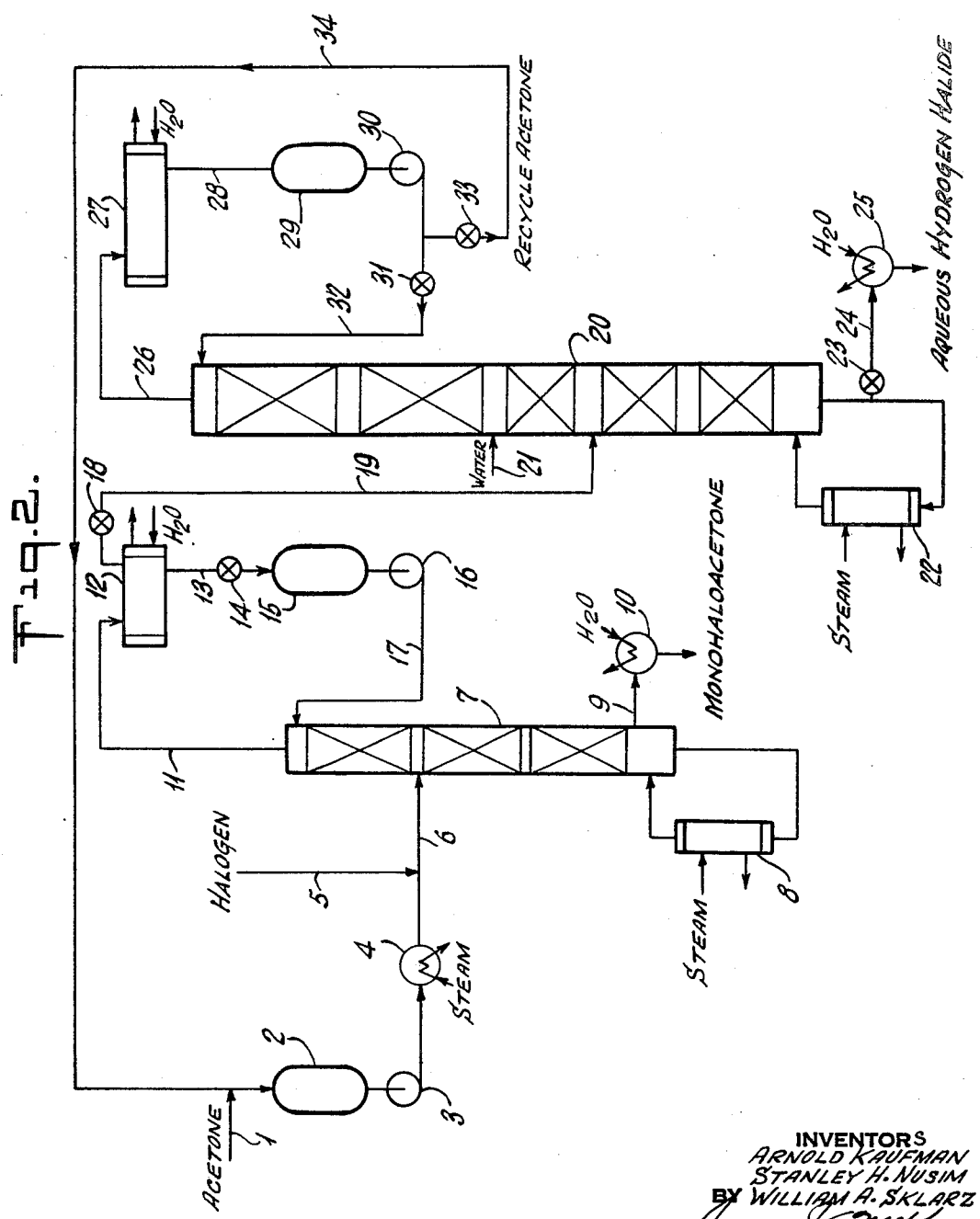

3,397,240
PROCESS FOR THE MONOHALOGENATION
OF ACETONE
Arnold Kaufman, Scotch Plains, Stanley H. Nusim, Teaneck, and William A. Sklarz, Clark, N.J., assignors to Merck & Co., Inc., Rahway, N.J., a corporation of New Jersey
Continuation-in-part of application Ser. No. 212,129, July 24, 1962. This application Apr. 7, 1966, Ser. No. 540,919
5 Claims. (Cl. 260—593)

ABSTRACT OF THE DISCLOSURE

An improved continuous process for preparing monohaloacetone by contacting acetone with a halogen gas in the vapor phase, the acetone halogen ratio being at least 3:1. The monohaloacetone formed is separated from the unreacted acetone and hydrogen halide gas by fractional distillation. The excess acetone and hydrogen halide mixture is then extractively distilled with water to separate this mixture into its constituents, hydrogen halide acid and acetone, the latter may be recycled.

This application is a continuation-in-part of co-pending application Ser. No. 212,129, filed July 24, 1962, now abandoned.

This invention relates to an improved continuous process for the monohalogenation of acetone. Specifically, it relates to a process for chlorinating or brominating acetone to obtain the monohalogenated acetone in good yield with only a minimum formation of polyhalogenated acetone and/or acetone condensation products.

Monochloroacetone and monobromoacetone are extremely reactive compounds useful in a wide variety of synthetic organic processes. As such, they are potentially very important materials. Unfortunately, the commercial acceptance of these materials has been limited in consequence of several disadvantages in their manufacturing processes. For example, the final product is relatively expensive and the degree of purity is not as high as desired. Because of the low purity, the product requires much handling in the form of purification steps. This is particularly objectionable in view of the well known noxious character of the materials. There are several reasons which appear to be the cause of the disadvantages mentioned. Among these is the variety of halogenated products possible from the halogenation and the difficulty of physically separating the products from by-products and reactants. All of these factors contribute to the disproportionately high cost of a product produced from inexpensive starting materials.

In further consideration of these factors, it is known that the halogenation of acetone ordinarily yields varying amounts of monohaloacetone, 1,1-dihaloacetone and 1,3-dihaloacetone. Mixtures of these products and especially mixtures containing the monohaloacetone and the 1,1-dihaloacetones are difficult to purify since their boiling points are very close to each other. Thus, commercial manufacturers are compelled to submit their halogenated products to expensive rectification schemes in order to obtain monochloroacetone and monobromoacetone of acceptable purity, usually of the order of 90% or better.

The state of the art as it existed prior to the discovery of the present invention is represented by the processes that are disclosed in U.S. Patent 2,116,893 issued to Paul Heisel, May 10, 1938, U.S. Patent 2,235,562 issued to E. J. Rahrs, March 18, 1941, and U.S. Patent 2,243,484 issued to G. H. Morey, May 27, 1941. Heisel discloses a batch process for chlorinating and brominating carbonyl compounds. Heisel recognized the need for avoiding the formation of highly halogenated and molecular condensation by-products in his process for monohalogenation. Heisel's method of eliminating this drawback was the neutralizing of the hydrogen halide produced. This, of course, proved to be undesirable for a number of reasons. The neutralization step increased the cost and the difficulty of carrying out the process, and made the hydrogen halide produced useless. Rahrs also discloses a process for the vapor phase chlorination of acetone. The Rahrs process results in low yields because of excessive formation of unwanted by-products. When he uses approximately equimolar quantities of chlorine and acetone, as shown in Example I, he obtains substantial amounts of polychlorinated product. When he uses an excess amount of acetone, as shown in his Example II, he forms the undesirable condensation by-product mesityl oxide. Morey describes a batch process for the preparation of monohalogenated ketones. This process is merely the reaction of acetone and a halogen, and his only unique concern is the use of acetone that is dried to less than 0.05% of water based on the weight of the reactants.

The continuous process of the present invention overcomes all of the difficulties that exist in previous processes. It permits the use of high acetone to halogen ratios which direct the reaction to essentially only monohaloacetone and at the same time provides for the rapid physical removal of commercially acceptable hydrogen halide, thereby preventing the reaction of this hydrogen halide with the excess acetone which would form undesired condensation products such as mestiyl oxide. Because of this, the excess acetone can then be recycled to give yields of monochloroacetone in the 90% range.

The difficulties encountered in the reaction of the process of the present invention may be appreciated when the equation representing the reaction between a halogen and acetone is further examined. This is as follows:

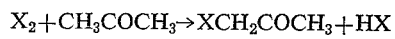

$$X_2 + CH_3COCH_3 \rightarrow XCH_2COCH_3 + HX$$

where X is a chlorine or bromine atom. It is well known that stoichiometric proportions of halogen and acetone result in the production of substantial amounts of polychlorinated products. Therefore, it is preferable to operate with an excess of acetone. However, the hydrogen halide formed in the reaction catalyzes the condensation of two molecules of acetone to form mesityl oxide. The presence of this compound in the monohalogenated product resulting from such a reaction is undesirable, first, because it reduces the yield obtained, and secondly, it increases the cost of the product by necessitating a further purification step.

It is an object of this invention to provide an economical continuous process for the production of monohaloacetones with a minimum formation of polyhalogenated products.

It is another object of this invention to provide a continuous process for the preparation of a monohaloacetone which does not require further steps for purification.

Another object is to provide a process for the halogenation of acetone in high yield.

It is still another object of this invention to provide an improvement in the continuous production of monohaloacetones which improvement minimizes the formation of acetone condensation products.

Yet another object is to provide an improvement in the continuous halogenation of acetone where the by-produced hydrogen halide is obtained in a commercially useful form.

Other additional objects of the present invention will become apparent to those skilled in the art by reading the specification and viewing the accompanying drawing referred to herein.

As previously stated, processes for reaction between a halogen and acetone are known in the art. According to the present invention the objects and advantages hereinabove set forth are accomplished by new and improved methods for carrying out the process in a continuous manner. In general, the invention contemplates allowing the reaction between acetone vapor and the halogenated vapor to take place in the presence of an unusually large excess of acetone over that required by stoichiometry, purifying the unreacted acetone by extractive distillation so as to remove all the hydrogen halide formed as a by-product of the reaction of the acetone and the halogen and recycling the purified acetone thus obtained to be reacted with fresh halogen.

In particular, it has been discovered that the total amount of acetone supplied to be reacted with the halogen must be from about 3 to about 10 moles per mole of halogen and preferably between about 4 to 7 moles per mole of halogen. The minimum mole ratios are set forth in the graph, FIGURE 1 of the drawing. The results indicated on the graph were obtained as described in Example I supra. Higher amounts of acetone may be used. However, economics dictate that a ratio of more than 10:1 would not be feasible.

The invention further contemplates that the unreacted acetone be separated from the monohaloacetone produced and then treated in a particular manner so as to remove essentially all of the hydrogen halide admixed with the unreacted acetone. This removal is effected by extractive distillation with water. In particular, the unreacted acetone-hydrogen halide mixture is contacted with a stream of water sufficient in amount and flow rate to extract, by dissolution, essentially all of the hydrogen halide therein. The term "essentially all" is meant to apply to the removal of not less than about 99% by weight of the hydrogen halide present in the mixture. As a result of this step there is obtained a water-wet stream of otherwise essentially pure acetone vapor which must be dried before it is reacted with fresh halogen upon subsequent recycling. It has been discovered that the water-wet acetone must be dried to a level of not more than about 2% by weight of water. Any suitable means of drying may be employed but it is preferred to employ a rectifying apparatus for this purpose.

It is preferred to use a combination of rectifying collumns for the process and this will now be described. In a preferred aspect of the invention, two packed vertical columns equipped with reboilers and vapor condensing attachments are utilized as the basic reaction apparatus. The first column is additionally equipped with vapor generating and mixing equipment and as such serves the purpose of providing the site for the monohaloacetone formation and accumulation and also supplies the means for separating unreacted acetone and by-produced hydrogen halide gas from the product. The column is generally packed with some suitable packing commonly used in the distillation art such as ceramic saddles, Raschig rings or the like. The depth of packing employed should be sufficient to ensure that the subsequently formed monohaloacetone will not be obtained in the overhead vapors once the column is operating under steady state conditions. This packing depth may be calculated using well known methods. In practicing the process of the invention, the vapor mixture of acetone and halogen is formed using conventional vaporizing equipment. The mixing is preferably done at a point outside, but proximate to the column and at or above the boiling temperature of acetone. The vapor mixture at this point contains monohaloacetone, hydrogen halide gas and unreacted acetone. It is directed into some suitable section of the column. The point of entry for the mixture, for optimum column efficiency, may be determined using conventional distillation calculations. In general, introduction into the column near the mid-point of the packing will yield suitable results.

The monohaloacetone condenses on the packing within the column and being the high boiler, concentrates at the bottom of the column. Most of the unreacted acetone and by-produced hydrogen halide gas pass overhead and are treated in the manner hereinafter specified. The reboiler is maintained at a temperature sufficient to effect the separation of dissolved unreacted acetone and hydrogen halide gas from the final product. After a steady state has been reached, this temperature will correspond to the boiling point of the solution obtained in the bottoms.

The unreacted acetone and by-produced halogen gases separated are obtained overhead where they are partially condensed in suitable partial condensing apparatus. The extent to which the overhead vapors are condensed and returned to the column will be determined by the reflux ratio in the system. The actual reflux ratio used does not constitute a critical part of this invention. However, it will be appreciated by those skilled in the art that there are optimum conditions for reflux which may be determined by conventional calculations. In the preferred method for practicing the invention, the reflux ratio is in the range of from 1:1 to 10:1 and most preferably from about 1:1 to 2:1. As a result of this phase of the invention, there is obtained in the reboiler after steady state, a grade of monohaloacetone of 90% or better purity and in yields ranging from 80–95%. There is no detectable amount of mesityl oxide in the monohaloaceone produced. The monohaloacetone itself is removed continuously at a rate consistent with efficient operation of the column either in the vapor state as the vapors in equilibrium with the reboiler solution, or as the liquid from the reboiler itself.

The uncondensed overhead vapors from the first column are next directed into a second packed column. In this column the vapors are made to contact a stream of water which will extract the hydrogen halide gas from the mixture leaving water-wet acetone. With regard to the column itself, it is preferred to employ a combination of packing depth, water introduction site and vapor introduction site which will allow the extraction of the hydrogen halide gas from the acetone-hydrogen halide vapor mixture in one section while providing enough column length and effective packing height to obtain acetone containing not more than 2% by weight of water in the overhead. Thus, that portion of the column below the introduction site of water and acetone-hydrogen halide vapor mixture will be the stripping or extraction section while that portion above the introduction site will be the acetone enriching section. The use of one column is not critical, however, and it will be appreciated that two separate columns may be employed; one for extraction and one for acetone drying. Moreover, the acetone need not be dried by distillation, but any other suitable means may be employed.

The amount and flow rate of water introduced into the column naturally depends on the amount of hydrogen halide present in the vapor mixture and may be calculated by well known methods. Enough water should be used to extract, by dissolution, essentially all of the hydrogen halide gas entering in the unreacted acetone stream and form the proper concentration in the reboiler for a constant boiling solution. Such a safeguard will ensure against obtaining appreciable amounts of hydrogen halide gas in the acetone overhead vapors. In general, the amount of water for the system presently being described will depend on the maximum concentrations possible for the reboiler solution. For hydrochloric acid this concentration is about 20% by weight of hydrogen chloride and for hydrobromic acid about 47% by weight of hydrogen bromide. Thus, the amounts of water used should be at least about 4 and preferably between 4.5–6 parts by weight per part of hydrogen chloride gas in the mixture and 1.1 and preferably between 1.5–2.5 parts by weight per part hydrogen bromide. Excessive amounts of water are avoided as being uneconomical.

As the water passes over the vapor stream, the hydrogen halide gas is dissolved and runs down the packing in the column in the form of an aqueous solution. This solution is collected in a bottoms reboiler which is maintained at a temperature sufficient to distill off any acetone that may have dissolved in the water stream. Such a temperature depends upon the strength of the hydrogen halide solution obtained in the bottoms but will generally run in the range from 100° to about 126° C. When large excesses of water are avoided in the extraction, the bottoms temperature will generally be around the constant boiling temperature for the hydrohalic solution. For hydrochloric acid this temperature is about 110° C. It will be understood that the bottoms temperature is critical only to the extent that it bears on the efficient operation of the column.

The acetone vapors obtained overhead are obtained in an essentially dry state when the procedures of the examples hereinafter indicated are used. It is essential to the success of this invention that before the unreacted acetone is recycled to the first column it be dried to a level of not more than about 2% by weight of water, and preferably less than 1.0% by weight of water. This may be accomplished in the same column in which the extraction takes place, as in the preferred manner of the invention, or it may be dried in any other suitable manner. The substantially dry acetone, once obtained, is then recycled to the first column either in the vapor state to react with fresh chlorine or bromine or directed into a holding tank as a liquid and subsequently used as a make-up for the reaction.

The concentrations of hydrogen halide solution obtained in the bottoms of the second column generally range from 10 to 20% by weight for hydrochloric acid solution and from 10 to about 47% for hydrobromic acid solutions. This product may be withdrawn directly and used in a variety of processes. There is no detectable mesityl oxide present in either the bottoms or overhead vapor stream. It is, in fact, another advantage of the process of this invention that if mesityl oxide were formed in the first column and carried over into the extracting column, the mesityl oxide would again be converted to acetone.

The particular equipment used, its design and construction, as well as reflux ratios, rate of heat input to condensers and reboilers, and the like employed in the foregoing discussion are not critical with respect to the invention. However, it will be apreciated by those skilled in the art that the equipment must satisfy certain technical requirements depending on various flow rates, pressure drops, heat inputs, rate of withdrawal of product and the like. These requirements, however, are the normal requirements incident to the extraction and distillation art and may be calculated by well known techniques.

In the drawing, FIGURE 1 is a graph indicating the relationship of the acetone-halogen mole ratio to the amounts of monohalogenated acetone, dihalogenated acetone and condensation by-products produced in the reaction. FIGURE 2 diagrammatically illustrates a typical continuous system for carrying out the novel process of the present invention.

Referring now more particularly to the drawings in detail wherein similar reference characters designate corresponding parts throughout the view, there is indicated at 34 a recycle line into which make-up acetone is supplied through delivery pipe 1 and said acetone enters acetone feed tank 2, from where it is pumped by pump 3 through vaporizer 4 into pipe 6 where it is joined by a halogen gas coming from halogen feed line 5. The gaseous mixture enters monohaloacetone column 7 in which the reaction is completed and fractional distillation takes place. The heat required for the distillation is supplied by the recirculating reboiler 8. Pure monohaloacetone concentrates in the bottom of column 7 and is removed via line 9 through product cooler 10. The unreacted acetone and hydrogen halide gas formed in column 7 passes through line 11 into partial condenser 12. The condensed acetone goes through line 13 and valve 14 into reflux drum 15 from which it is returned through pump 16 and line 17 to the top of column 7. Non-condensed acetone and hydrogen halide passes through valve 18 via line 19 into the extractive distillation column 20. Water for the extractive distillation is introduced into column 20 via line 21. Heat for the extractive distillation is supplied by recirculating reboiler 22. The aqueous hydrogen halide is removed from column 20 via valve 23 and line 24 through product cooler 25. The wet acetone vapor passes through the upper sections of column 20 where it is dried by fractional distillation and passes from the top of column 20 through line 26 to total condenser 27. The condensate is collected via line 28 into reflux drum 29 and through pump 30 either as reflux to column 20 via valve 31 and line 32 or as recycle via valve 33 and recycle line 34.

The following examples illustrate methods of carrying out the present invention, but it is to be understood that they are given for purposes of illustration and not of limitation.

Example 1

The results of the effect of the halogen-acetone mole ratio experiments are shown on the graph of FIGURE 1. The method of carrying out the experiment is set forth below.

Dry chlorine gas is fed at a rate of c. 10 gm./min. to refluxing acetone in a 1-liter 3-neck heated R. B. flask provided with subsurface gas addition tube, agitator, thermometer and reflux condenser. The charge quantity of acetone is different for each run and is specified below. After 141.9 gm. of chlorine (2.0 gm.-mol) has been added, refluxing is continued for an additional 15 minutes. The reaction mixture is then cooled to room temperature and a sample analyzed by vapor-phase chromatography. The noncondensable gases from the chlorination are led subsurface into an agitated beaker containing 150 gm. calcium carbonate and 1 liter distilled water. A sample of this mixture is analyzed for ionic chlorides (equiv. to HCl given off) at the end of the run.

The following table summarizes the results obtained in carrying out these experiments.

TABLE I

| Run | A | B | C | D |
|---|---|---|---|---|
| Acetone charged: | | | | |
| Grams | 348 | 232 | 174 | 116 |
| Gram-mols | 6.0 | 4.0 | 3.0 | 2.0 |
| Mol ratio, acetone/chlorine | 3.0 | 2.0 | 1.5 | 1.0 |
| VPC analysis (area percent): | | | | |
| 1,1-dichloroacetone | 1.3 | 2.7 | 4.3 | 11.7 |
| 1,3-dichloroacetone | 0.2 | 1.0 | 1.7 | 5.5 |
| Condensation products | 4.2 | 0.6 | 0.5 | 0 |

As can be seen from the test data above and by viewing the graph of FIGURE 1, as the mole ratio increases, the amount of dichloroacetones formed decreases; but at the same time, the amount of condensation products formed increases. Therefore, in order to have the continuous process of the present invention operate efficiently, there must be at least a 3:1 mole ratio of acetone to halogen. However, since as this mole ratio increases, the resulting undesired condensation products will increase, the physical separation of the unreacted excess acetone from the by-product hydrogen halide is of critical importance because this separation prevents the formation of these condensation products.

Example 2

Acetone is continuously vaporized in a steam vaporizer at 57° C. and at a rate sufficient to give 7.66 gm./min. Chlorine gas is introduced into the acetone vapor stream at a rate of 1.39 gms./min. giving a mole ratio of acetone to chlorine of 6.73. The mixed gases are fed into the approximate mid-point of a 1" diameter by 18" long vacuum-jacketed glass column equipped with about 15" of ¼" ceramic saddle packing. The monochloroacetone formed as a result of the vapor mixing is observed to condense on the packing and collect in a reboiler at the bottom of the column. The liquid in the reboiler is maintained at its boiling point which initially is about 57° C. As more product is formed this temperature increases to about 122° C. The vapors from the column are partially condensed and the liquid thereby obtained refluxed back into the column such that the reflux ratio is about 3/2.

The uncondensed vapors are then passed into a second vacuum-jacketed column 2" in diameter and 33" long and packed to a depth of 30" with ¼" ceramic saddles. The point of introduction of this vapor into the column is at a point corresponding to ⅓ the depth of packing measured from the bottom of the packing. Water is introduced into the column at a point about ⅓ down from the top of the packing at a rate of 5.49 gms./min. The liquid in the reboiler is maintained at its boiling point, a temperature of about 107° C. The concentration of the hydrochloric acid obtained in the bottoms (and continuously siphoned out) is approximately 11.7 weight percent. The acetone vapor obtained overhead contains less than 2% by weight of water and no detectable amount of hydrogen chloride gas. This stream is then recycled to the initial point of acetone-chlorine mixing wherein the vaporization of fresh acetone is maintained at a rate sufficient to give a total of 7.66 gm./min. when mixed with the recycled acetone vapor.

The product, monochloroacetone is withdrawn continuously as the vapors in equilibrium with the reboiler solution of the first column. This vapor is found to contain 92% by weight of monochloroacetone corresponding to an 89% yield on the chlorine consumed.

When bromine is used in place of chlorine in the above procedure using an equivalent amount of water in the extraction step, similar results are obtained.

Examples 3–6

The procedure of Example 2 is followed varying the reaction conditions as indicated in Table II. The results obtained are also given.

TABLE II

| Ex. | Avg. flow rate, gm./min. | | | Mol ratio, /acetone chlorine | Monochloroacetone, wt. percent | |
|---|---|---|---|---|---|---|
| | Acetone | Chlorine | Water | | Yield on chlorine | Monochloroacetone in product |
| 3 | 4.53 | 0.99 | 4.43 | 5.58 | 89.9 | 91.8 |
| 4 | 5.20 | 0.99 | 5.89 | 6.41 | 91.9 | 92.2 |
| 5 | 6.23 | 1.58 | 4.99 | 4.81 | 75 | 90.3 |
| 6 | 8.40 | 1.39 | 4.13 | 7.37 | 83 | 92 |

NOTE.—There is no detectable hydrogen chloride gas in the acetone vapor effluent from the second column.

Examples 7–9

The procedure of the foregoing examples is followed except that the water extracting column and packing depth is increased in length by about 30% to effect greater separation of water from the acetone vapors. Table III shows the various conditions employed and the results of the experiments.

TABLE III

| Ex. | Feed rates, g./min. | | | Mole ratio, acetone/ chlorine | Withdrawal rates, g./min. | | | Product assay, wt. percent | | | HCl conc., wt. percent | In acetone, wt. percent | Yield based on chlorine |
|---|---|---|---|---|---|---|---|---|---|---|---|---|---|
| | Chlorine | Acetone | Water | | Acetone | HCl sol. | Product | Acetone | Monochloroacetone | Dichloroacetone | | | |
| 7 | 1.38 | 6.50 | 5.27 | 5.75 | 5.11 | 6.87 | 2.38 | 2.9 | 91.7 | 5.4 | 12.8 | 1.5 | 96.9 |
| 8 | 1.35 | 5.40 | 5.07 | 4.88 | 6.40 | 4.51 | 2.00 | 6.1 | 90.7 | 3.2 | 10.8 | 1.4 | 95.5 |
| 9 | 1.39 | 6.04 | 5.19 | 5.30 | 5.70 | 4.04 | 0.67 | 1.6 | 95.2 | 3.2 | 12.4 | 1.1 | 86.7 |

NOTE.—There is no detectable amount of hydrogen chloride gas in the acetone vapor effluent from the second column.

From the foregoing it will be seen that there is herein provided an improved continuous process for the monohalogenation of acetone which accomplishes all of the objects of the present invention and others including many advantages of great practical utility and commercial importance and acceptance.

While specific embodiments of the present invention have been named and described, it will be apparent to those skilled in the art that changes may be made in the detail shown without departing from the spirit of the present invention or the scope intended any departure from the above description which conforms to the present invention is intended to be included within the scope of the claims.

We claim:

1. In the process for continuous vapor phase monohalogenation of acetone comprising reacting an excess of acetone vapor with a halogen vapor and also including the removal of the resulting hydrogen halide gas from the excess acetone and the monohaloacetone formed wherein said halogen is chlorine or bromine, the improvement which comprises (a) reacting the mixture of said acetone vapor and said halogen vapor at a temperature range which at atmospheric pressure is from about 57° C. to about 138° C., the mole ratio of said acetone charged to said halogen supplied is in excess of from about 3:1 to about 10:1, thereby forming the mixture of monohaloacetone, hydrogen halide gas and unreacted acetone;

(b) immediately thereafter separating, by fractional distillation, the hydrogen halide gas and the unreacted acetone from the monohaloacetone produced;

(c) immediately thereafter contacting the separated hydrogen halide gas and the unreacted acetone with a material consisting essentially of water, the weight of said water equal to a ratio of from about 1:1 to about 10:1 parts per part of hydrogen halide produced which is sufficient to extract essentially all of the hydrogen halide gas therefrom, thereby forming an aqueous solution of said hydrogen halide;

(d) immediately thereafter separating, by fractional distillation, said unreacted acetone from said hydrogen halide solution;

(e) recovering in step (b) essentially pure monohaloacetone and recovering in step (d) essentially pure aqueous hydrohalic acid and essentially pure acetone.

2. In the process for continuous vapor phase monohalogenation of acetone comprising reacting an excess of acetone vapor with a halogen vapor and also including the removal of the resulting hydrogen halide gas from the excess acetone and the monohaloacetone formed wherein said halogen is chlorine or bromine, the improvement which comprises (a) continuously providing within a first distillation column a mixture which is the reaction product obtained from a combination of acetone vapor and halogen vapor wherein the acetone:halogen reactant mole ratio is in excess of from about 3:1 to about 10:1;

(b) immediately thereafter removing unreacted acetone and by-produced hydrogen halide gas from said vapor mixture as a vapor by fractional distillation while collecting monohaloacetone in the bottom of said column;

(c) introducing the vapor stream of unreacted acetone and hydrogen halide gas into a second column and contacting said stream with a material consisting essentially of water, the weight of water equal to a ratio of about 1.1 to about 10.0 parts per part of hydrogen halide present which is sufficient to extract by fractional distillation essentially all of the hydrogen halide gas therefrom and form an aqueous solution of said hydrogen halide containing at least the amount of water present in the constant boiling aqueous solution of said hydrogen halide gas;

(d) separating by fractional distillation in said second column the unreacted acetone from said hydrogen halide solution;

(e) drying said unreacted acetone by rectification to a level of not more than 2% by weight of water;

(f) recycling said dried acetone to be reacted with fresh halogen;

(g) and recovering in step (b) essentially pure monohaloacetone and recovering in step (d) essentially pure aqueous hydrohalic acid.

3. The method according to claim 2 wherein the halogen is chlorine and the first column is operated at a reflux ratio of between 1:1 and 10:1.

4. The method according to claim 3 wherein the amount of water used in said second column is at least four times the weight of the hydrogen halide present in the unreacted acetone:hydrogen chloride gas stream entering said second column.

5. The method according to claim 4 wherein the rectification of said unreacted acetone is accomplished in said second column.

References Cited
UNITED STATES PATENTS

| | | | |
|---|---|---|---|
| 1,704,751 | 3/1929 | Luther et al. | 260—593 |
| 2,199,934 | 5/1940 | Heisel et al. | 260—593 |
| 2,235,562 | 3/1941 | Rahrs | 260—593 |

BERNARD HELFIN, *Primary Examiner.*

M. JACOB, *Assistant Examiner.*